(12) United States Patent
Taylor (10) Patent No.: US 7,204,318 B2
(45) Date of Patent: Apr. 17, 2007

(54) TRACKING HITCH ASSEMBLY UTILIZING TRACTOR LIFT ARMS AS STABILIZERS

(75) Inventor: Harold Taylor, LaGrange, GA (US)

(73) Assignee: Durand-Wayland, Inc., LaGrange, GA (US)

( * ) Notice: Subject to any disclaimer, the term of this patent is extended or adjusted under 35 U.S.C. 154(b) by 0 days.

(21) Appl. No.: 10/628,985

(22) Filed: Jul. 28, 2003

(65) Prior Publication Data

US 2004/0161087 A1 Aug. 19, 2004

Related U.S. Application Data

(60) Provisional application No. 60/399,072, filed on Jul. 26, 2002.

(51) Int. Cl.
*A01B 59/043* (2006.01)
(52) U.S. Cl. ....................... 172/450; 172/439
(58) Field of Classification Search ............... 172/439, 172/443, 450, 447, 449, 672, 679; 180/14.1; 280/405.1, 416.2
See application file for complete search history.

(56) References Cited

U.S. PATENT DOCUMENTS

| | | | | |
|---|---|---|---|---|
| 2,341,807 A | * | 2/1944 | Olmstead et al. | 280/446.1 |
| 2,743,117 A | * | 4/1956 | Hutchings | 172/272 |
| 2,906,546 A | * | 9/1959 | Hiser | 280/490.1 |
| 2,934,357 A | * | 4/1960 | Gewecke | 280/760 |
| 3,062,561 A | * | 11/1962 | Sigurd et al. | 172/439 |
| 3,093,394 A | * | 6/1963 | McCollum | 280/416.2 |
| 3,432,184 A | * | 3/1969 | Tweedy | 172/272 |
| 3,583,494 A | * | 6/1971 | Thompson et al. | 172/285 |
| 4,069,874 A | * | 1/1978 | Buck et al. | 172/450 |
| 4,776,606 A | * | 10/1988 | Stephenson et al. | 172/248 |
| 4,895,211 A | * | 1/1990 | Harris | 172/271 |
| 5,267,747 A | * | 12/1993 | Thorn | 280/416.2 |
| 5,706,901 A | * | 1/1998 | Walters et al. | 172/439 |
| 5,816,339 A | * | 10/1998 | Parsons et al. | 172/449 |
| 6,119,789 A | * | 9/2000 | Taylor | 172/439 |

* cited by examiner

*Primary Examiner*—Thomas B. Will
*Assistant Examiner*—Alicia Torres
(74) *Attorney, Agent, or Firm*—Kilpatrick Stockton LLP (57) ABSTRACT

A tracking hitch assembly couples to the drawbar of the tractor in a conventional manner. To prevent the hitch from pivoting with respect to the drawbar, the hitch includes an adjustable hitch stabilizer which engages the lift arms of the tractor. When a pivoting force is exerted against the hitch, one lift arm is placed in tension, and the other lift arm is placed in compression. Thus the hitch is prevented from pivoting with respect to the drawbar.

13 Claims, 9 Drawing Sheets

TRACKING HITCH ASSEMBLY UTILIZING TRACTOR LIFT ARMS AS STABILIZERS

CROSS-REFERENCE TO RELATED APPLICATION

This application claims the benefit of Provisional Application No. 60/399,072 filed Jul. 26, 2002, hereby incorporated herein by reference.

TECHNICAL FIELD

The present invention relates generally to trailer hitches and relates more specifically to a tracking hitch assembly for moving the pivot point of the hitch rearward from a drawbar to the front of a towed implement and utilizing tractor lift arms as stabilizers.

BACKGROUND OF THE INVENTION

Many agricultural tractors have two primary means of hitching to implements. First, there is a fixed drawbar, which is employed when the implement is simply being towed. Second, there are spaced-apart, hydraulically operated lift arms, which are employed when using an implement such as a plow or scraper which needs to be raised and lowered. In addition, it may be necessary to make a further connection between the tractor and the towed implement if a power take-off ("PTO") is used to drive the implement in some fashion.

The fixed drawbar suffers certain shortcomings when used to tow implements. So as not to interfere with implements coupled to the lift arms, the drawbar is of necessity rather short, such that the pivot point is well forward of the towed implement. However, so that the towed implement can more accurately follow the track of the towing vehicle, it is often desirable to move the pivot point rearward to a location near the front of the towed implement. Efforts have been made to address this problem using so-called "tracking hitch" designs. However, known tracking hitch designs employ the tractor lift arms to carry the load of the front of the agricultural implement and require stabilizer chains linked to the lift pins and to the top link point of the tractor. These designs are tedious and time-consuming to install. In addition, they lack any means of restraining the front of the towed implement from rising in the event of a load shift resulting in negative tongue weight.

SUMMARY OF THE INVENTION

Stated generally, the present invention comprises a tracking hitch assembly which prevents the hitch assembly from rotating relative to the towing vehicle without the need for stabilizer chains. The tracking hitch assembly can hitch a towed implement to a tractor more easily and quickly.

Stated more specifically, the tracking hitch assembly of the present invention couples to the drawbar of the tractor in a conventional manner. Thus the front end of the towed implement is prevented from rising in the event of a negative tongue weight. To prevent the hitch from pivoting laterally with respect to the drawbar, the hitch includes an adjustable hitch stabilizer which engages the lift arms of the tractor. When a lateral pivoting force is exerted against the hitch, one lift arm is placed in tension, and the other lift arm is placed in compression. Thus the hitch is prevented from laterally pivoting with respect to the drawbar.

DETAILED DESCRIPTION OF THE DISCLOSED EMBODIMENT

Referring now to the drawings, in which like numerals indicate like elements throughout the several views, FIGS. 1–5 illustrate a hitch 10 and a hitch pivot 12. As will be seen, the hitch 10 provides a laterally rigid connection to the drawbar and lift arms of an agricultural tractor, while the hitch pivot 12 provides a pivotable connection between the rear of the hitch 10 and a towed implement.

Figure 1:
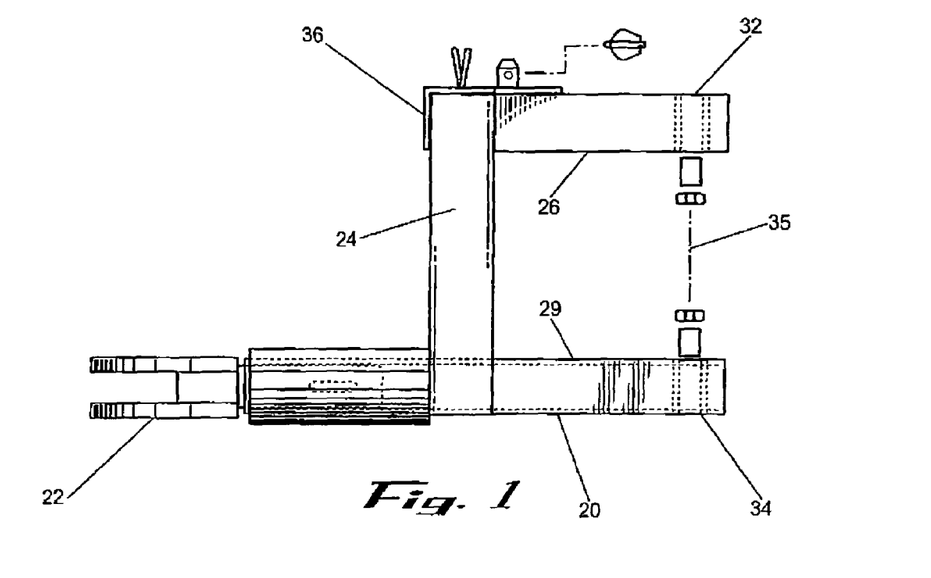
FIG. 1 is a side view of the hitch in a hitch assembly according to a preferred embodiment of the present invention.
Figure 2:
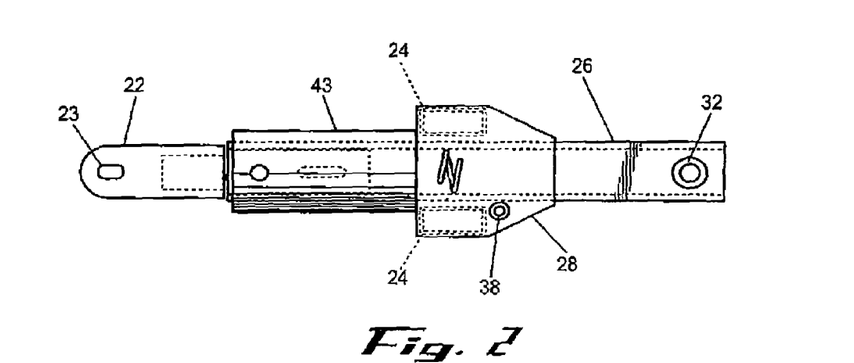
FIG. 2 is a top view of the hitch shown in FIG. 1.
Figure 3:
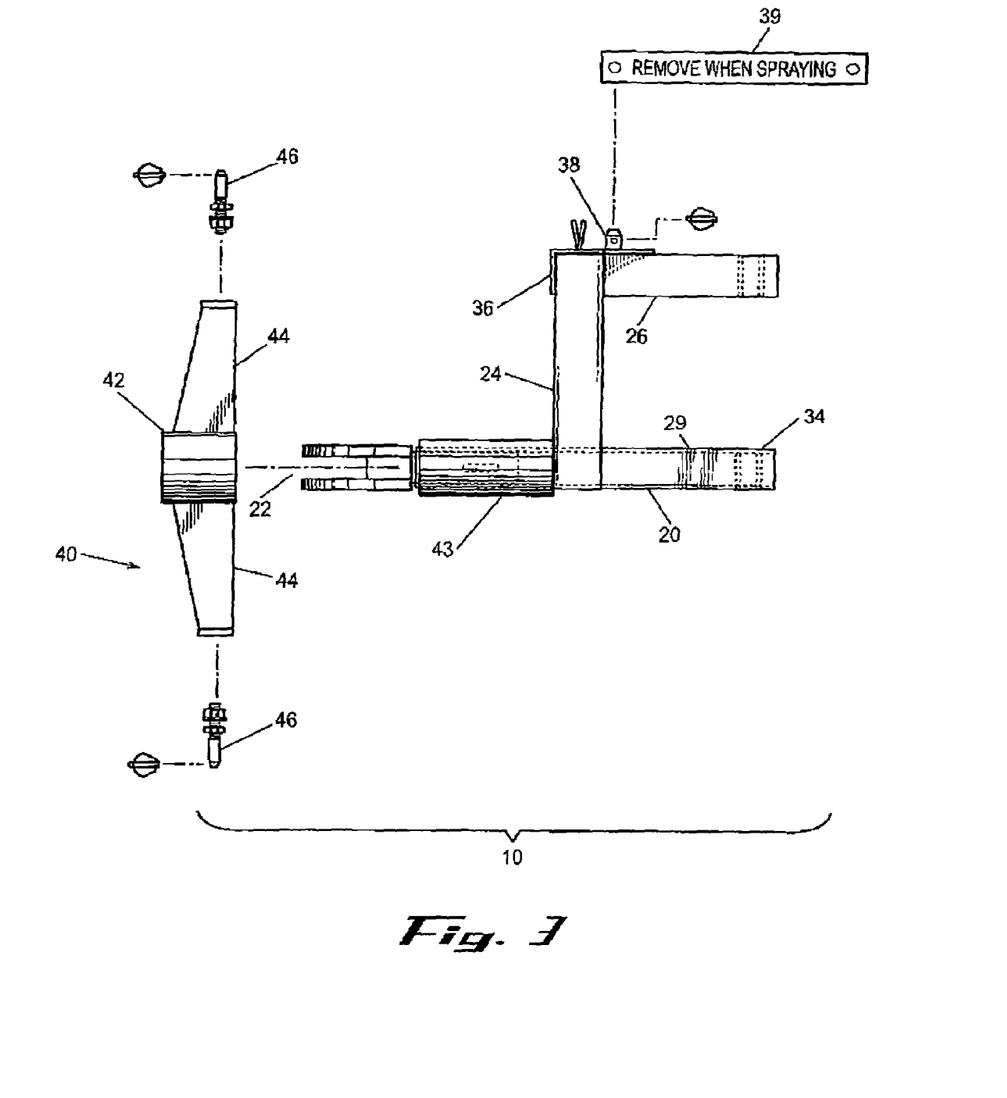
FIG. 3 is an exploded side view of the hitch shown in FIG. 1, with the stabilizer rotated 90 degrees for illustrative purposes.

Refering first to FIGS. 1–3, the hitch 10 includes an elongated lower hitch tube 20. A clevis bar 22 is provided at the forward end of the lower hitch tube 20. Slots 23 through both sides of the clevis bar are adapted to receive a hitch pin to couple the forward end of the hitch 10 to the drawbar of a tractor. The slots 23 preferably are elongated on the lengthwise dimension of the clevis bar 22 to prevent subjecting the hitch pin to a shearing force when the tractor tows the towed implement on hilly terrain.

Upright frame members 24 are mounted on either side of the lower hitch tube 20 at a location behind the clevis bar 22 and spaced forward from the rearward end of the lower hitch tube 20. The space between the upright frame members 24 provides a passage for a drive shaft of a towed implement to be connected to die power takeoff of the towing tractor. An upper hitch tube 26 has a forward end mounted between the two upright frame members 24 and extends rearward. A cap gusset plate 36 is mounted atop the upper ends of the upright frame members 24 and extends along a forward portion of the upper hitch tube to provide additional mounting support for the upper hitch tube 26. A lock pin 38 projecting upwardly adjacent the rearward edge of the upper hitch tube 26 provides a means for attaching a transport bar 39, discussed below.

Gusset plates may optionally be mounted in the included angle between each upright frame member 24 and the underside of the upper hitch tube 26 if desired for additional support of the upper hitch tube.

The upper hitch tube 26 is disposed in parallel, spaced-apart relation to the rearward portion of the lower hitch tube 20. Coaxial openings 32, 34 are formed adjacent the rearward ends of the upper hitch tube 26 and lower hitch tube 20, respectively. As will be seen, the coaxial openings 32, 34 define the pivot axis 35 of the towed implement with respect to the towing vehicle.

With further reference to FIGS. 1–3, a hitch stabilizer 40 is slidably and rotatably mounted to a stabilizer support sleeve 43 which is fitted to the forward portion of the lower hitch tube 20 between the clevis bar 22 and the upright frame members 24. The hitch stabilizer 40 has a longitudinal axis which extends transverse to the longitudinal axis of the stabilizer support sleeve 43. The hitch stabilizer 40 comprises a central stabilizer tube 42 which is slidably and rotatably mounted to the stabilizer support sleeve 43. Hitch stabilizer wings 44 are connected to and extend laterally from the central stabilizer tube 42. A lift pin 46 extends outwardly from the outer end of each hitch stabilizer wing 44. The lift pins 46 couple the lift arms of a tractor to the stabilizer 40, as discussed below.

Figure 4:
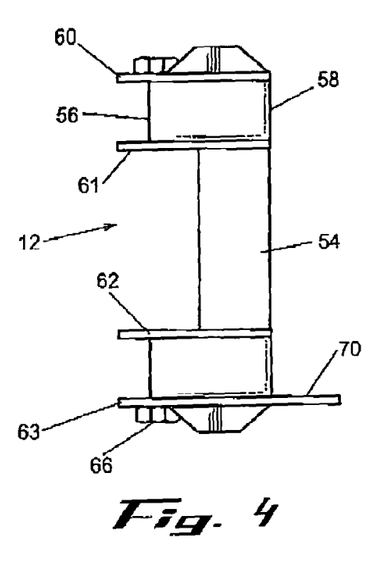
FIG. 4 is a side view of a hitch pivot in the hitch assembly of the preferred embodiment.
Figure 5:
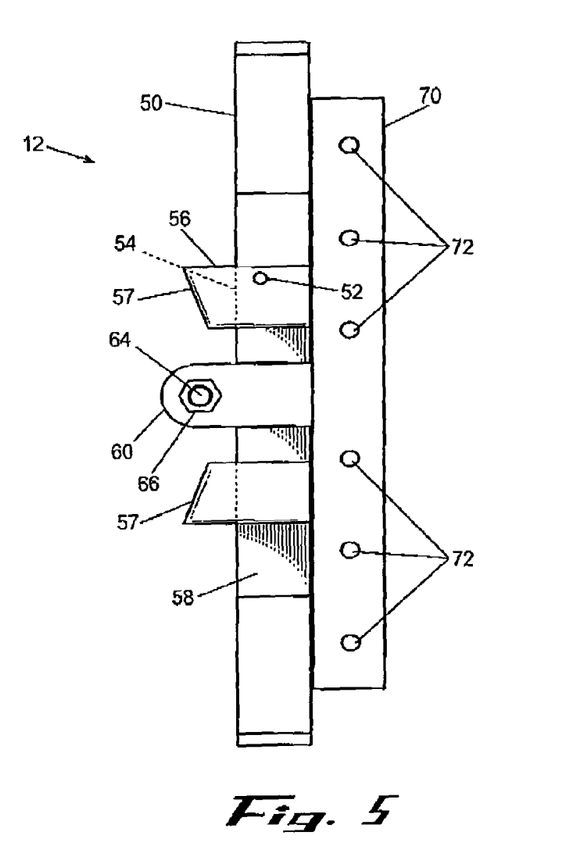
FIG. 5 is a top view of the hitch pivot of FIG. 4

Refering now to FIGS. 4 and 5, the hitch pivot 12 comprises a transversely elongated main frame member 50. A pair of upright frame members 54 are mounted at intermediate locations on the main frame member 50 and extend upward from the main frame member. A stop tube 56 is disposed atop each of the upright frame members 54. The forward edge 57 of each stop tube 56 is angled. When the hitch pivot 12 is attached to the hitch 10, the stop tubes 56 limit the range of rotation of the hitch pivot 12 (and hence the towed implement) with respect to the hitch (and hence the towing tractor).

An upper frame member 58 is welded between the stop tubes 56. Look pin 52 is mounted to the outside of the left stop tube 56 substantially at a level corresponding to the lock pin 38 on the upper hitch tube to provide a means of attaching a transport bar 39 to the hitch pivot 12 for purposes of transporting the implement by means other than the tractor, e.g., a truck to move the implement from one location to another. A first pivot plate 60 is mounted to the upper edge of the upper frame member 58 and extends forward therefrom. A second pivot plate 61 is mounted to the lower edge of the upper frame member 58 and extends forward therefrom in parallel, spaced-apart relation to the first pivot plate 60. Similarly, a third pivot plate 62 is mounted to the upper edge of the main frame member 50 and extends forward therefrom, while a fourth pivot plate 63 is mounted to the lower edge of the main frame member 50 and extends forward therefrom in parallel, spaced-apart relation to the third pivot plate 62. Coaxial, vertically aligned openings 64 (FIG. 5) are formed in the four pivot plates 60–63. Nuts 66 are welded to the upper surface of the first pivot plate and to the lower surface of the fourth pivot plate in coaxial alignment with the openings 64 to provide a means for securing bolts to the pivot plates.

An attaching plate 70 is mounted to the lower face of the main frame member 50 and extends rearward. A plurality of holes 72 is formed in the attaching plate. The attaching plate 70 is adapted to abut an upper or lower surface of the forward end of a towed implement and is fastened to the towed implement by threaded fasteners inserted through the openings 72 to secure the hitch pivot 12 to the towed implement.

With the hitch pivot mounted to an implement to be towed, the rectangular opening defined by the upright frame members 54, the main frame member 50, and the upper frame member 58 provides a passage through which the drive shaft of the implement can couple to the power takeoff of the tractor.

Figure 6:
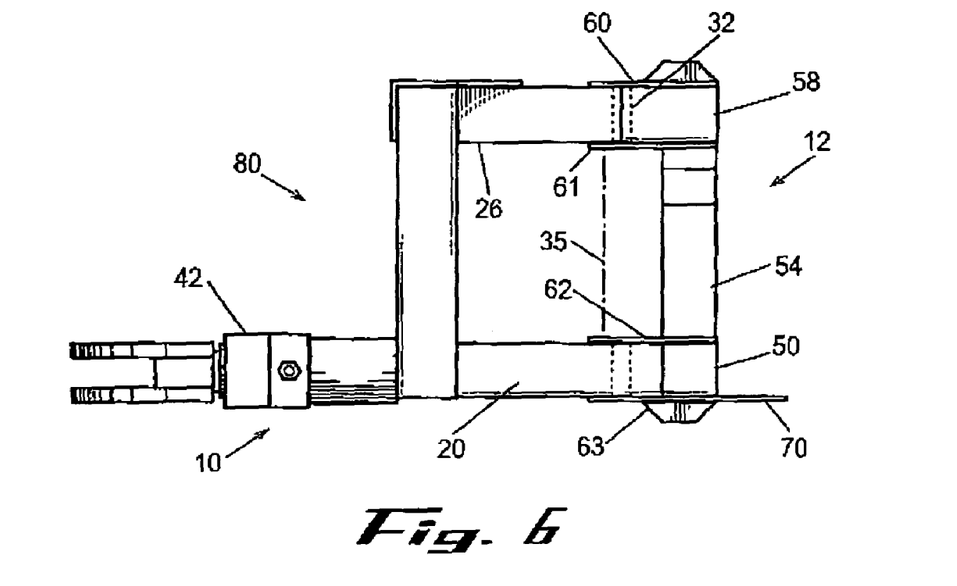
FIG. 6 is a side view showing the hitch of FIGS. 1–3 coupled to the hitch pivot of FIGS. 4 and 5.
Figure 7:
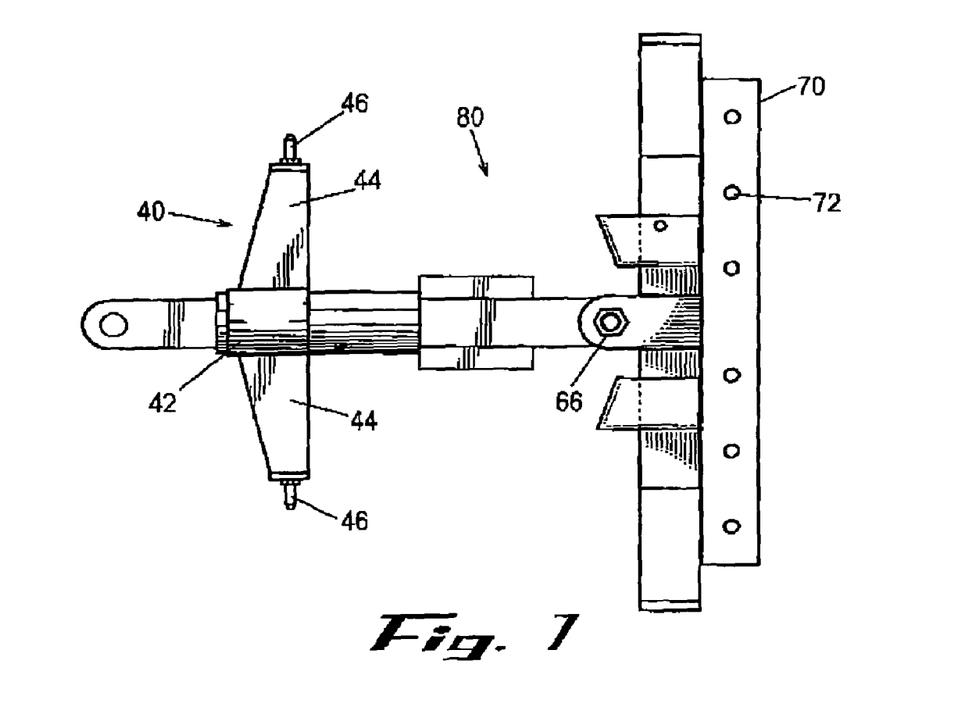
FIG. 7 is a top view of the coupled hitch and hitch pivot of FIG. 6.

FIGS. 6 and 7 depict the hitch 10 mounted to the hitch pivot 12 to form a hitch assembly 80. The rearward end of the upper hitch tube 26 of the hitch 10 is received between the first and second pivot plates 60, 61 of the hitch pivot 12. The opening 32 in the upper hitch tube 26 (FIG. 6) aligns with the openings 64 in the first and second pivot plates 60, 61 (FIG. 5). A bolt 65 shown in FIG. 3 can be inserted from the bottom, through the aligned openings, and threaded into the nut 66 welded to the upper surface of the first pivot plate. Similarly, the rearward end of the lower hitch tube 20 of the hitch 10 is received between the third and fourth pivot plates 62, 63 of the hitch pivot 12. The opening 34 in the lower hitch tube 20 aligns with the openings 64 in the third and fourth pivot plates 62, 63. A bolt 67 shown in FIG. 3 can be inserted from the top, through the aligned openings, and threaded into the nut 66 welded to the lower surface of the fourth pivot plate.

With the hitch 10 and hitch pivot 12 thus aligned, the pivot point 35 is located near the front of the towed implement.

Figure 8:
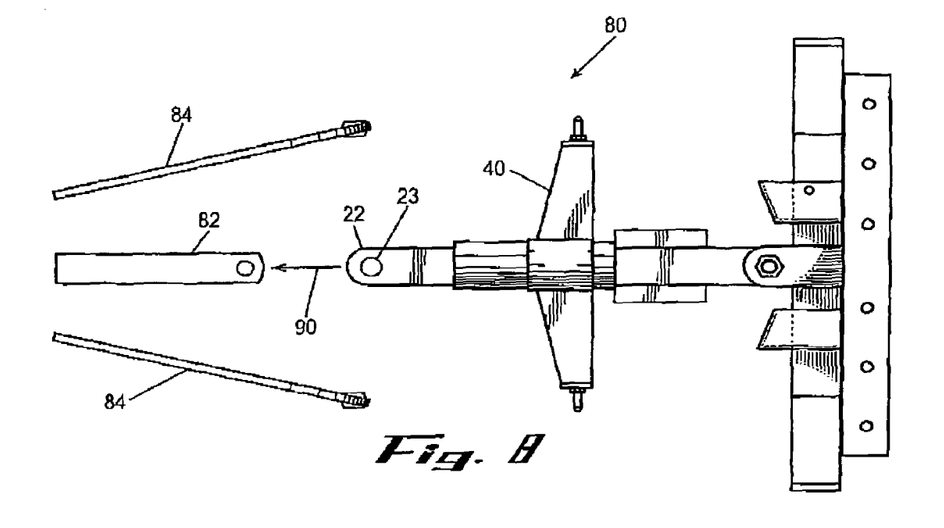
FIG. 8 is a top view showing the hitch assembly of the present invention about to be hitched to a tractor.
Figure 9:
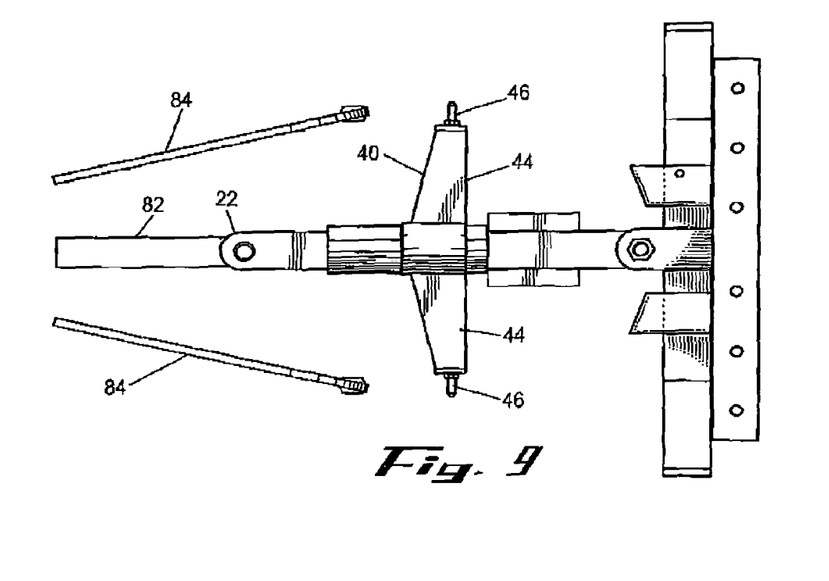
FIG. 9 shows the hitch assembly of FIG. 8 coupled to the drawbar of the tractor.
Figure 10:
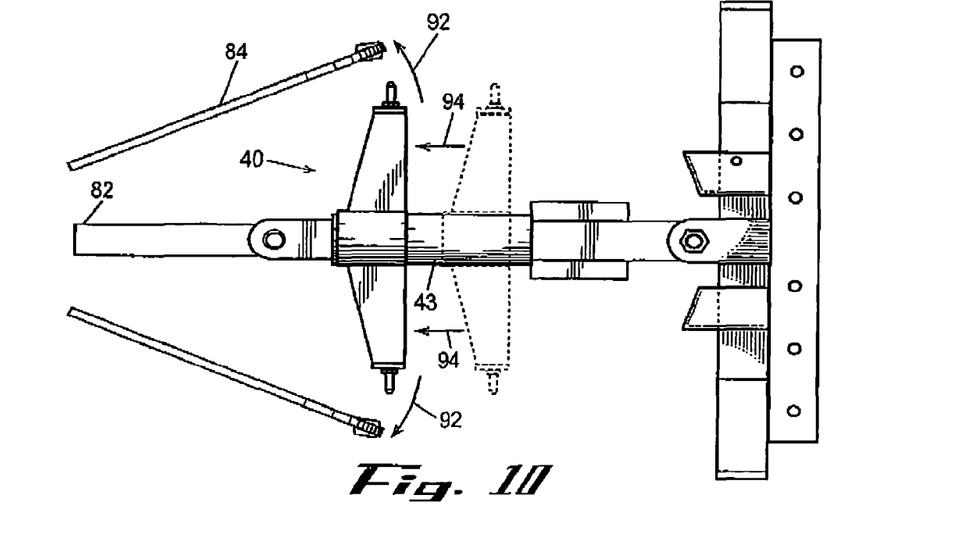
FIG. 10 shows the lift arms of the tractor pivoted outward and an adjustable hitch stabilizer of the hitch assembly sliding forward into a position to engage the lift arms.
Figure 11:
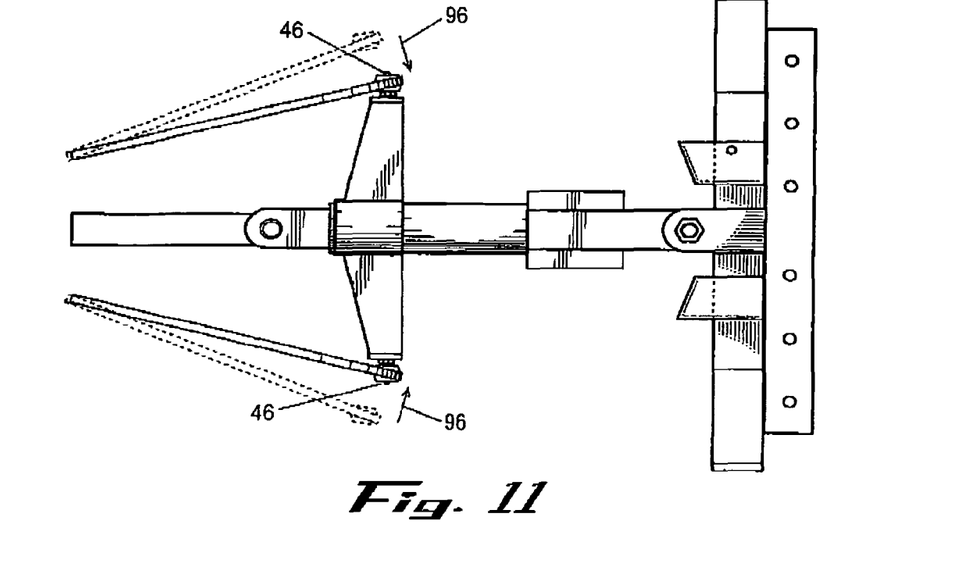
FIG. 11 shows the hitch stabilizer of the hitch assembly coupled to the lift arms of the tractor.

FIGS. 8–11 illustrate the coupling of the hitch assembly 80 to the drawbar 82 and lift arms 84 of a tractor (not shown). In FIG. 8 the hitch assembly 80 is advanced toward the tractor, or the tractor is backed toward the hitch assembly, achieving relative movement between the tractor and the hitch assembly in the direction indicated by the arrow 90. The clevis bar 22 at the forward end of the hitch assembly 80 engages the drawbar 82 of the tractor, as shown in FIG. 9. In FIG. 10 the lift arms 84 of the tractor are pivoted outward, in the direction indicated by the arrows 92. The hitch stabilizer 40 slides forward on the lower stabilizer support sleeve 43 in the direction indicated by the arrows 94. In FIG. 11, the lift arms 84 pivot back to their normal positions as indicated by the arrows 96, and the lift arms couple to the lift pins 46 on the hitch stabilizer 40.

Figure 12:
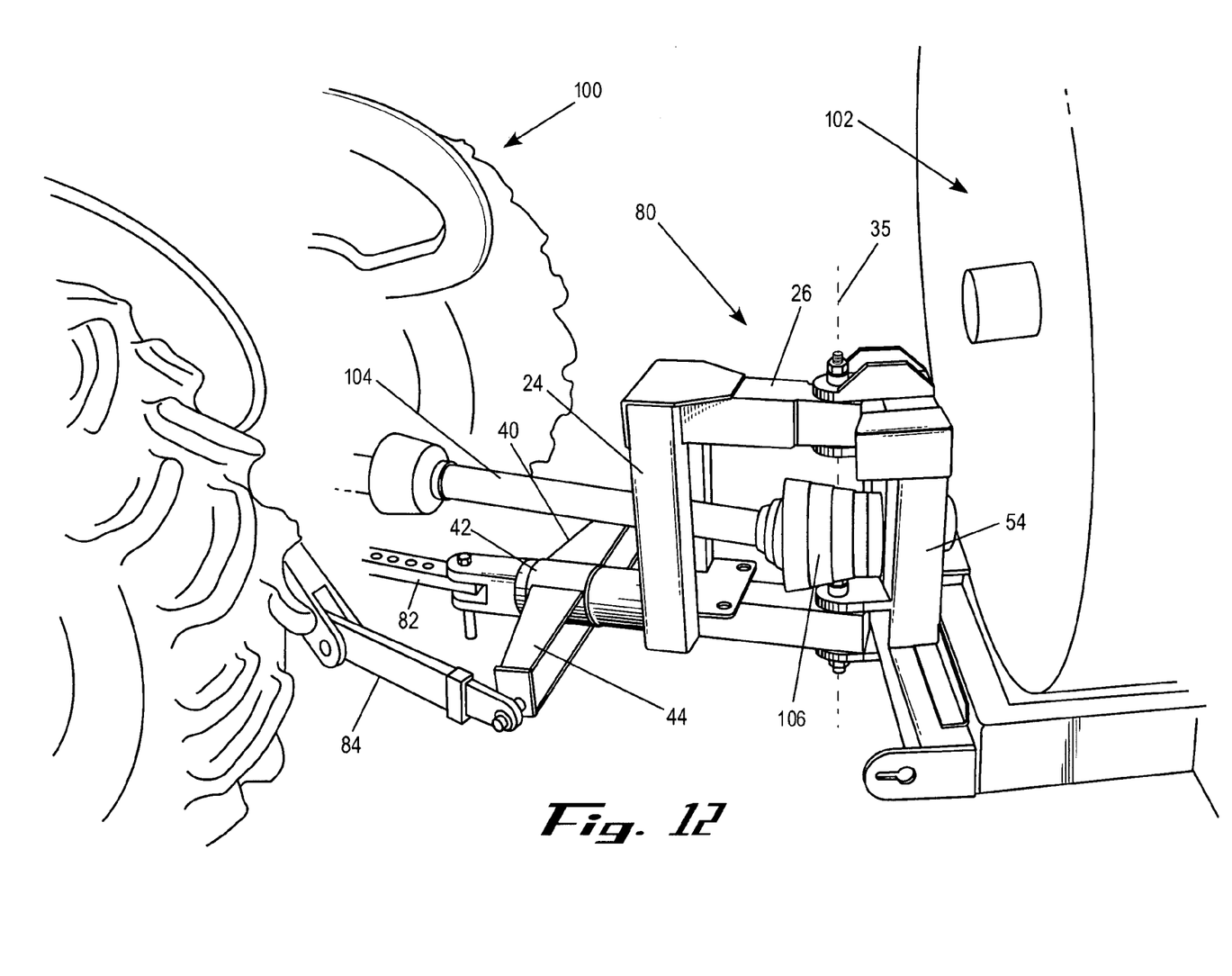
FIG. 12 is a perspective view of a tractor hitched to a towed implement using the hitch assembly of the present invention.
Figure 13:
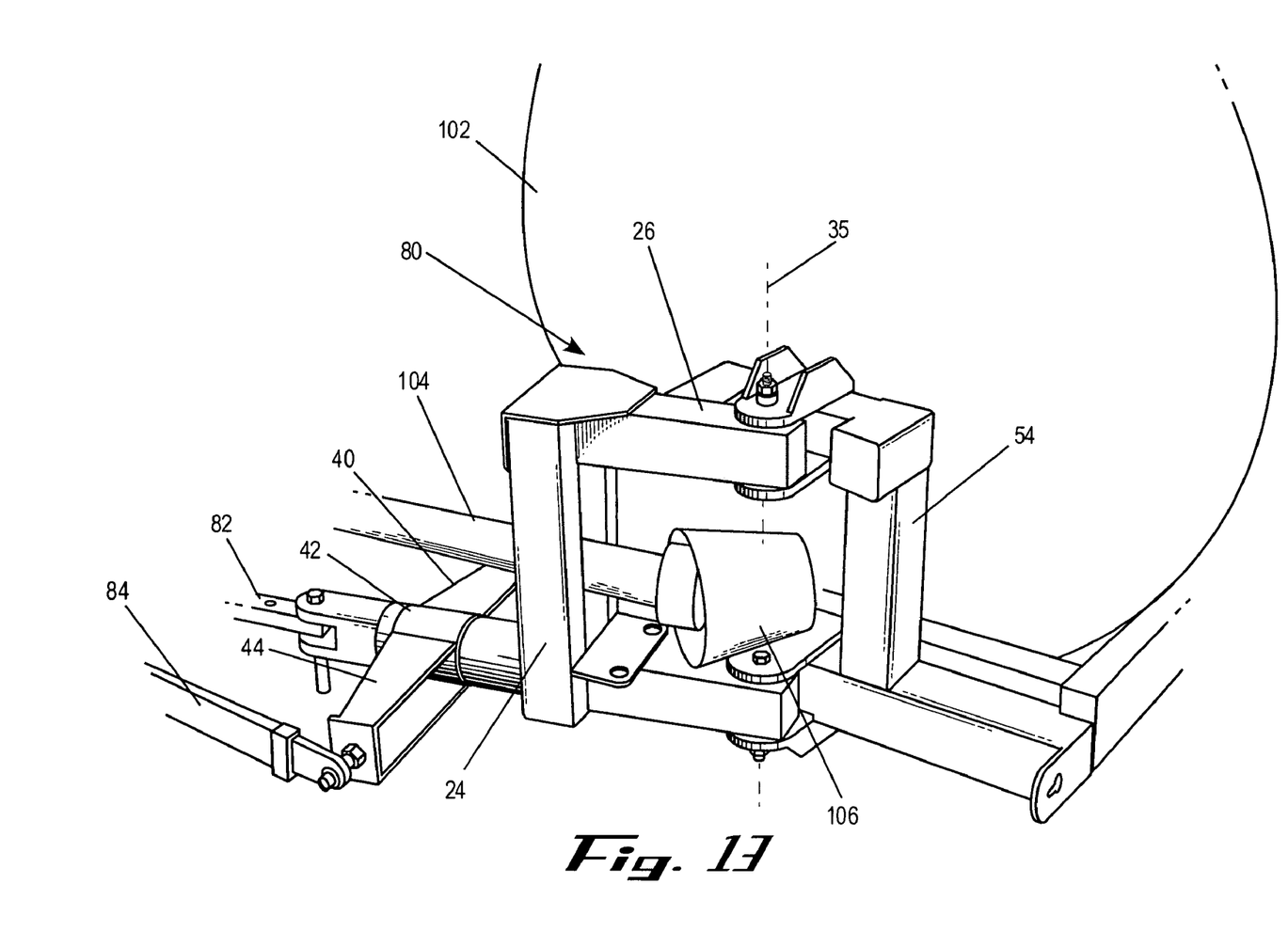
FIG. 13 is a perspective view of the tractor, implement, and hitch assembly of FIG. 12 with the tractor turned at an angle with respect to the towed implement.
Figure 14:
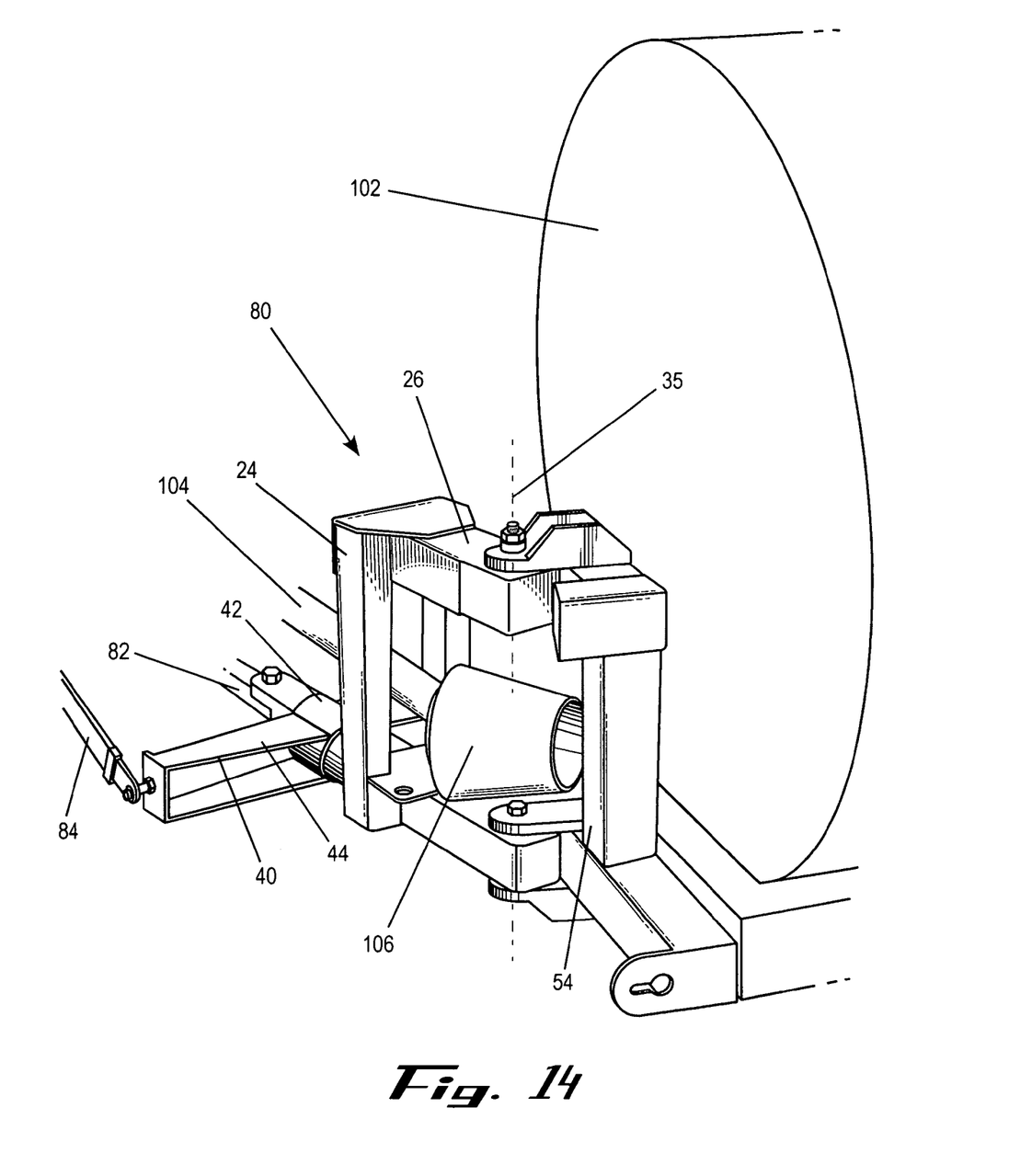
FIG. 14 is another perspective view of the tractor, implement, and hitch assembly of FIG. 12 with the tractor turned at an angle with respect to the towed implement.

Referring now to FIGS. 12–14, the hitch assembly 80 is illustrated coupling a towing vehicle, in this case a Ford agricultural tractor 100, to a towed implement, more specifically, a sprayer 102 The hitch 10 is mounted to the drawbar 82 and lift arms 84 of the tractor 100 in the manner explained above with respect to FIGS. 8–11. The hitch pivot 12 is attached to a forward end of the frame of the sprayer 102. A driveshaft 104 driven by the power take-off of the tractor provides power to the sprayer. The driveshaft 104 couples to a constant velocity joint 106 at the forward end of the sprayer 102 to permit pivoting movement between the tractor 100 and the sprayer 102. The constant velocity joint 106 is located along the axis defined by the two pivot bolts 65, 67 of the hitch assembly 80. Thus the driveshaft 104 pivots about the same pivot point 35 as the hitch assembly 80, making possible extreme turning angles between the tractor 100 and the sprayer 102 without the hitch assembly interfering with the driveshaft.

The lift arms of the tractor are permitted to "float." When a lateral rotational force is exerted against the hitch assembly, one lift arm is placed in tension, and the other lift arm is placed in compression. The lift arms in conjunction with the drawbar thus stabilize the hitch assembly without the need for any chains or additional braces.

It will be appreciated that the capability of the hitch stabilizer 40 to slide on the stabilizer support sleeve 43 permits the hitch assembly 80 to be used with a variety of towing vehicles that may have lift arms of differing lengths.

Finally, it will be understood that the preferred embodiment has been disclosed by way of example, and that other modifications may occur to those skilled in the art without departing from the scope and spirit of the appended claims.

The invention claimed is:

1. Apparatus for attaching a towed implement to the drawbar of a tractor having lift arms laterally displaced from the drawbar, comprising:
   a hitch;
   a first pivotable connector associated with a forward portion of the hitch, said first connector being configured for selective coupling to the drawbar of a tractor to establish a first pivotable connection between the hitch and the tractor,
   a stabilizer extending laterally from the hitch and having elements for coupling to the lift arms of the tractor such that the stabilizer prevents the hitch from pivoting with respect to the drawbar about said first pivotable connection when a pivoting force is exerted against the hitch, the stabilizer being displaceable along the length of the hitch to accommodate variations in longitudinal spacing between the drawbar and lift arms of the tractor;
   a hitch pivot for mounting to an implement to be towed; and
   a second pivotable connector associated with a rearward portion of the hitch for establishing a second pivotable connection between the hitch and the hitch pivot, whereby pivoting movement between the tractor and the towed implement occurs at the second pivotable connection.

2. The apparatus of claim 1, wherein the stabilizer is rotatable in a plane transverse to the length of the hitch to accommodate rolling movement of the tractor relative to the towed implement.

3. The apparatus of claim 1, wherein the stabilizer comprises:
   a tubular central portion slidably mounted on a forward portion of the hitch;
   stabilizer wings extending laterally from the central portion; and
   attachment elements associated with the stabilizer wings in distal relation to the central portion for coupling the stabilizer wings to the lift arms of the tractor.

4. Apparatus as in claim 1, wherein the hitch pivot comprises:
   a main frame for attachment to the towed implement;
   a pair of upright frame members mourned at mutually spaced apart intermediate locations on the main frame and extending upwardly from the main frame;
   an upper frame extending between the upright frame members above the main frame;
   upper pivot means mounted to the upper frame member;
   lower pivot means mounted to the main frame in alignment with the upper pivot means; and
   means pivotably connecting the upper and lower pivot means to the hitch to establish the pivotable connection between the hitch and the front end of the towed implement.

5. Apparatus as in claim 1, wherein the hitch comprises:
   an elongated lower hitch tube a front end of which is adapted for coupling to the drawbar of the tractor, and having a rearward portion;
   upright frame members mounted in mutually spaced apart relation on each side of the lower hitch tube;
   an upper hitch tube mounted between the upright frame members and extending rearward in parallel spaced-apart relation to the rearward portion of the lower hitch tube; and
   pivot means adjacent rearward ends of the upper hitch and the lower hitch tube, the pivot means defining a pivot axis between the tractor and the towed implement.

6. Apparatus as in claim 5, wherein the hitch pivot comprises:
   a main frame for attachment to the towed implement;
   a pair of upright frame members mounted at mutually spaced apart intermediate locations on the main frame and extending upwardly from the main frame;
   an upper frame extending between the upright frame members above the main frame;
   upper pivot means mounted to the upper frame member and adapted for pivotable connection with the pivot element on the upper hitch tube; and
   lower pivot means mounted to the main frame in alignment with the upper pivot means and adapted for pivotable connection with the pivot element on the lower hitch tube.

7. Apparatus as in claim 1, wherein said first connector is configured to establish the first pivotable connection in a generally horizontal plane.

8. Apparatus for attaching a towed implement to the drawbar of a tractor having lift arms laterally displaced from the drawbar, comprising:
   a hitch;
   a first pivotable connector associated with a forward portion of the hitch, said first connector being configured for selective coupling to the drawbar of a tractor to establish a first pivotable connection between the hitch and the tractor,
   a stabilizer extending laterally from the hitch and having elements for coupling to the lift arms of the tractor such that the stabilizer prevents the hitch from pivoting with respect to the drawbar about said first pivotable connection when a pivoting force is exerted against the hitch, the stabilizer being rotatable in a plane transverse to the length of the hitch to accommodate rolling movement of the tractor relative to the towed implement;
   a hitch pivot for mounting to an implement to be towed; and
   a second pivotable connector associated with a rearward portion of the hitch for establishing a second pivotable connection between the hitch and the hitch pivot, whereby pivoting movement between the tractor and the towed implement occurs at the second pivotable connection.

9. The apparatus of claim 8, wherein the stabilizer comprises:
   a tubular central portion rotatably mounted on a forward portion of the hitch;
   stabilizer wings extending laterally from the central portion; and
   attachment elements associated with the stabilizer wings in distal relation to the central portion for coupling the stabilizer wings to the lift arms of the tractor.

10. Apparatus as in claim 8, wherein the hitch pivot comprises:
- a main frame for attachment to the towed implement;
- a pair of upright frame members mounted at mutually spaced apart intermediate locations on the main frame and extending upwardly from the main frame;
- an upper frame extending between the upright frame members above the main frame;
- upper pivot means mounted to the upper frame member;
- lower pivot means mounted to the main frame in alignment with the upper pivot means; and
- means pivotably connecting the upper and lower pivot means to the hitch to establish the pivotable connection between the hitch and the front end of the towed implement.

11. Apparatus as in claim 8, wherein the hitch comprises:
- an elongated lower hitch tube a front end of which is adapted for coupling to the drawbar of the tractor, and having a rearward portion;
- upright frame members mounted in mutually spaced apart relation on each side of the lower hitch tube;
- an upper hitch tube mounted between the upright frame members and extending rearward in parallel spaced-apart relation to the rearward portion of the lower hitch tube; and
- pivot means adjacent rearward ends of the upper hitch and the lower hitch tube, the pivot means defining a pivot axis between the tractor and the towed implement.

12. Apparatus as in claim 8, wherein the hitch pivot comprises:
- a main frame for attachment to the towed implement;
- a pair of upright frame members mounted at mutually spaced apart intermediate locations on the main frame and extending upwardly from the main frame;
- an upper frame extending between the upright frame members above the main frame;
- upper pivot means mounted to the upper frame member and adapted for pivotable connection with the pivot element on the upper hitch tube; and
- lower pivot means mounted to the main frame in alignment with the upper pivot means and adapted for pivotable connection with the pivot element on the lower hitch tube.

13. Apparatus as in claim 8, wherein said first connector is configured to establish the first pivotable connection in a generally horizontal plane.

* * * * *